Dec. 31, 1935.  M. A. RAINES  2,026,322
RECEPTACLE FOR GROWING PLANTS
Filed April 13, 1934  2 Sheets-Sheet 1

Inventor:
Morris A. Raines,

Dec. 31, 1935.   M. A. RAINES   2,026,322
RECEPTACLE FOR GROWING PLANTS
Filed April 13, 1934   2 Sheets-Sheet 2
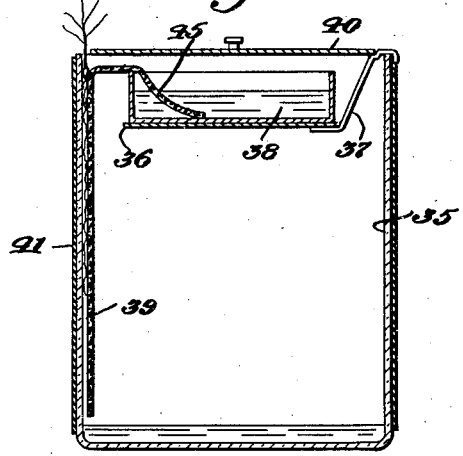
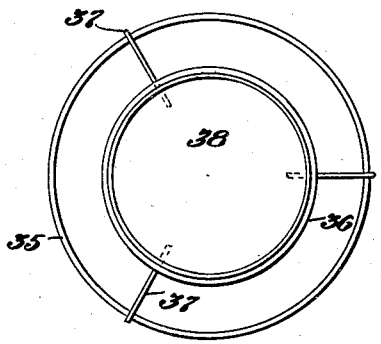
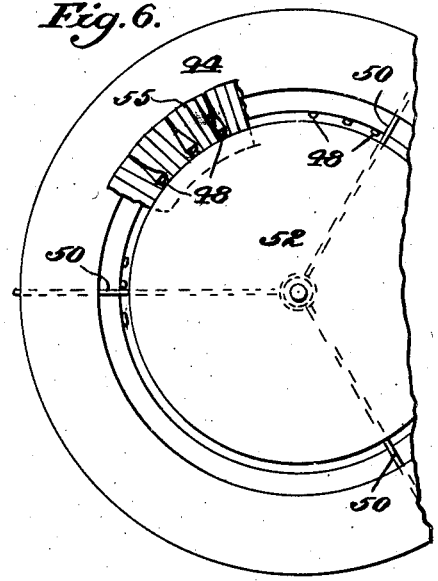
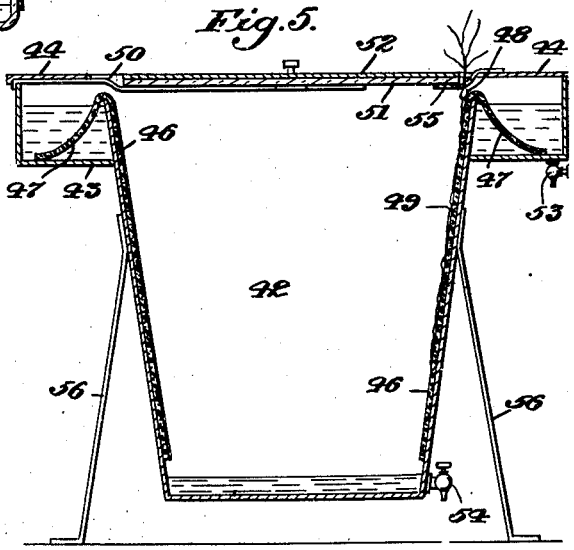
Inventor:
Morris A. Raines, Patented Dec. 31, 1935

2,026,322

UNITED STATES PATENT OFFICE 2,026,322

RECEPTACLE FOR GROWING PLANTS

Morris A. Raines, Washington, D. C.

Application April 13, 1934, Serial No. 720,475

17 Claims. (Cl. 47—38)

The present invention relates broadly to an apparatus permitting the germination, development, and growth of a plant by the use of only water, or liquid nutrient such as in the form of a solution, colloid, or any suitable dispersion. The apparatus embodying the present invention has more particular use in experimental work with plants or for demonstration of the manner of growth of plants to students or to the public.
More particularly, the present invention relates to an apparatus permitting the development and growth of a plant—of a type which ordinarily grows with its root system in the soil—with its roots growing on, and usually at least in part attached to, a sheet of water absoring or water imbibing material which is held suspended, or supported in a position of inclination to the horizontal, and the upper end of which dips into water or plant nutrient solution contained in a pan appropriately situated for the purpose.

To prevent undue evaporation of water from the sheet, and to provide for the root system of the plant an atmospheric environment of near 100% humidity, the sheet of absorbent material is situated in a chamber which is almost entirely enclosed. One side of the enclosing chamber is of glass, permitting inspection of the root system of the plant in situ, and without disturbing it. Openings in the upper wall of the chamber, properly disposed, permit the upper part of the plant to grow freely into the open air outside the chamber.

Such an apparatus is a new and useful improvement in the art of growing plants which is especially advantageous where the grower's interest is in the size, quality, appearance, and mode of development of the roots of the plant as, when a plant is grown in the type of receptacle here described, there is produced a practically two dimensional root system which is readily available for display, inspection or manipulation, and which is grown throughout its extent and life under the (for many purposes) advantageous condition of not being subject to the mechanical compression of the weight of a mass of soil upon it.

Broadly the present apparatus comprises: a pan adapted to contain the plant nutrient in the form of a solution, colloid, or other suitable dispersion; a sheet of any suitable porous material such as any suitable textile, or blotting paper, or any other material which will absorb the nutrient and carry it whether by capillary or colloidal-imbibitional action or by gravity to the seed or to the roots of the plant; a glass plate preferably covering the sheet of absorbent material. This serves to prevent moisture evaporation and permits viewing the roots of the plant. An opaque covering is provided for the viewing glass so as to exclude light from the roots of the plant. The absorbent sheet preferably has one end disposed in the pan containing the liquid nutrient material and is suspended from the pan; and the lower end of the sheet is preferably disposed in a lower pan which receives the drippings from the absorbent sheet.

The invention will be understood by reference to the accompanying drawings, which illustrate four forms of the apparatus which have been constructed and put to successful use. It is understood that the forms here described are merely illustrative and that other modifications of the invention, falling within the scope of the appended claims, will be apparent to persons skilled in the art.

In the drawings, Fig. 1 is a sectional view of one form of the receptacle.

Fig. 3 is a sectional view of a third form; and

Fig. 4 is a plan view of the form shown in Fig. 3;

Fig. 5 is a sectional view of still another form; and

Fig. 6 is a plan view thereof.

Figure 1:
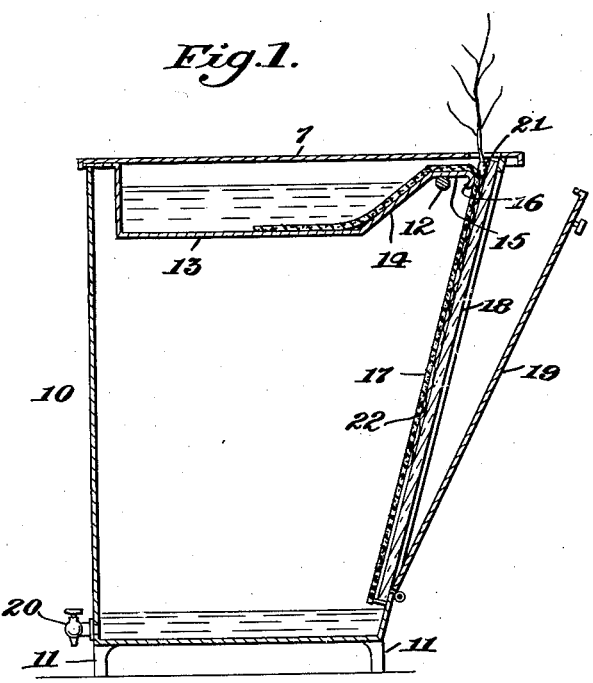
Figure 2:
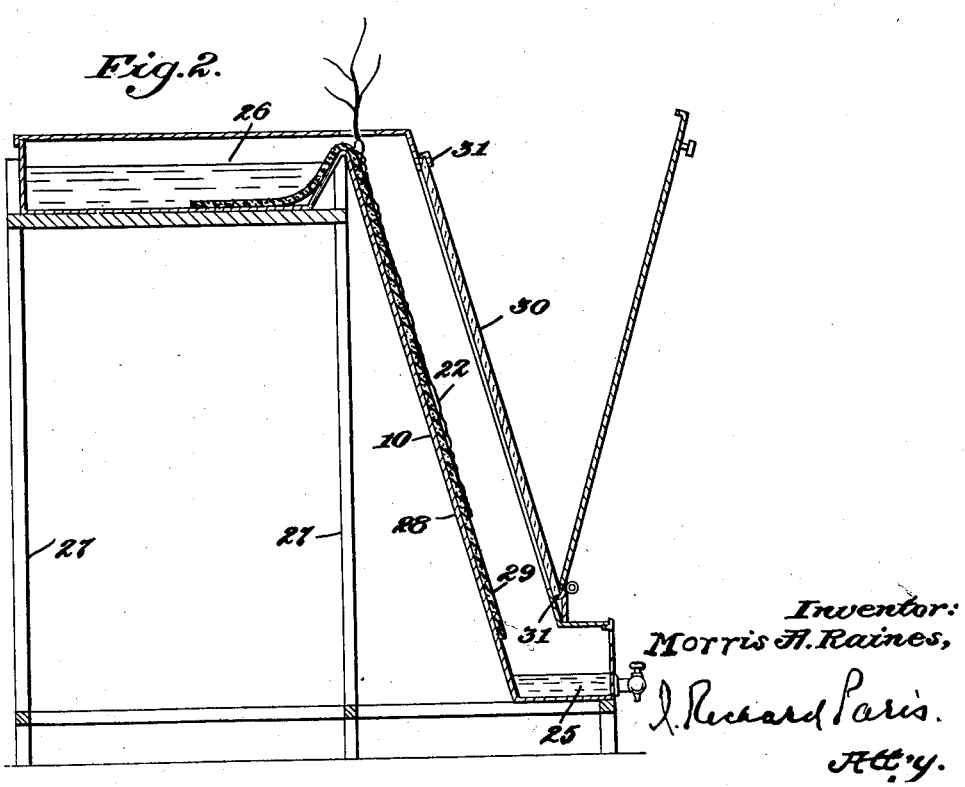
Fig. 2 is a sectional view of another form.

The forms illustrated in Figs. 1 and 2 have this in common, that the sheet of material along which the roots develop rests against a flat surface. This permits the entire root system to be viewed from a single point in front of the sheet on which the root system is growing, and photographs of the root system may be readily obtained. In the forms of the receptacle illustrated in Figs. 3 and 5, on the other hand, the sheet of absorbent material rests against a cylindrical or conical surface. These are more compact forms of the receptacle, and more economical to construct.

Another feature of construction in which the different forms of the receptacle are unlike is in the distance between the sheet on which the roots grow, and the glass side of the chamber through which they may be viewed. In forms illustrated in Figs. 1 and 3, the sheet of absorbent material (and therefore the roots growing on its surface) are practically in contact with the glass wall of the chamber; while in the receptacles illustrated in Figs. 2 and 5, the roots, while attached to and rooted in the sheet, are permitted to grow in an air space.

In Figs. 1 and 2, the reference character 10 indicates a chamber supported on the legs 11. The side walls of the chamber carry the cross bar 12.

The top of this chamber is covered with the pan 13, which is supported by the upper edge of the rear wall of the chamber and by the cross bar 12. The pan 13 has a forwardly and upwardly inclined front wall 14 and a horizontal portion 15 resting on the cross bar. The portion 15 is preferably with a curved edge 16 as shown, so as to permit the absorbent sheet to curve smoothly over this edge.

The pan 13 contains liquid nutrient in the form of a solution, colloid, or any other dispersion. In order to prevent or minimize vaporization of this solution, a cover 7 is provided for the pan.

In the form shown in Fig. 1 the front to back dimension at the top of the chamber is greater than at the bottom. The front wall 18 of the chamber, therefore, inclines rearwardly and downwardly. This front wall is preferably of glass so that the plant and, more particularly, its root development may be viewed without disturbing the plant. The hinged metal cover 19 is normally closed and shields the root system of the plant from light.

The sheet 17, of any suitable absorbent material whether of vegetable, animal, or mineral origin, such as textile material, blotting paper, or asbestos paper or the like, is disposed in the manner shown, with the upper part thereof immersed in the liquid nutrient and the major portion thereof resting against the glass plate 18. The nutrient material is distributed by the sheet to all of its parts by capillary or colloidal-imbibitional action. Gravity also aids in the distribution of the nutrient.

The overflow or drippings are collected in the bottom of the chamber, and the same may be drained as desired by the petcock 20.

A quantity of the liquid should preferably be maintained in the bottom of the chamber 10 so as to maintain the atmosphere therein approximately saturated with moisture, thereby minimizing evaporation from the absorbent sheet.

By the construction shown in Fig. 1 and described herein, the space between the sheet 17 and the glass plate 18 is substantially two dimensional in that, in the absence of any plant growth, the sheet adheres to the glass. In use, a seed or seeds are placed upon the surface of the absorbent sheet adjacent to the glass plate. The seed is shown at 21. The seed, fed by the nutrient from the pan 13, germinates, sprouts, and sends its roots 22 downwardly between the absorbent sheet and the glass plate and the upper part of the plant extends upwardly as shown.

By means of this device the nutrient may be varied as desired. The flexible absorbent sheet 17 is largely disposed in an enclosed chamber and is thereby protected against loss of water by evaporation. By opening the hinged metal cover 19, the root system of the plant may be viewed. In this arrangement the length of the root system is not limited for the vertical dimension of the apparatus may be varied to suit the particular plant or plants. The root system of the plant, tending to grow straight downwards, grows against the glass plate, drawing water and nutriment from the sheet in back of it. By means of the root hairs and fine rootlets, the root system adheres to the wet sheet. As a result there is produced a two-dimensional root system spread along the surface of the wet sheet and pressed against the glass plate, and visible in full when viewed through the glass.

The form shown in Fig. 1 is especially well adapted for plants with thin or fibrous root systems.

In the form shown in Fig. 2, a distinct free space between the wet sheet and the glass plate is provided. This form is especially well adapted for growing plants having thick roots, or bulbous or tuberous roots such, for instance, as the sweet potato or the like. This form is also well adapted for the performance of mechanical or chemical local operations upon the roots, whether for experimental purposes or to secure variations in directions and type of growth of the root, or of the plant as a whole.

Referring to Fig. 2, the lower pan 25 is disposed below and somewhat in front of the upper pan 26. A structural frame 27 supports the upper pan. The metal plate 28, inclined somewhat forwardly and downwardly, connects the rear wall of the lower pan with the front wall of the upper pan. The flexible absorbent sheet 29, of the same type as that shown in Fig. 1, rests against the plate 28 and has its upper end immersed in the nutrient in the upper pan 26. The glass plate 30 is spaced from the metal plate 28 and from the flexible absorbent sheet 29 as shown. The hinged metal cover plate serves the same purpose as the cover 19 in Fig. 1.

In this form the glass plate is carried by a frame 31 and if desired, it may be removed therefrom so as to provide access to the closed chamber housing the root system for the performance of operations. Similar provisions may be made in Fig. 1.

The form shown in Fig. 3 is advantageous where it is desired to economize on space and generally when it is desired to employ apparatus and devices commonly available in the laboratory. In this form 35 is a glass jar having a shelf 36 suspended from its upper edge by means of the wires or brackets 37. A small pan 38 is placed upon the shelf 36 and contains water and/or any desired liquid nutriment. The nutriment carrier 39 is disposed against the inside face of the glass wall of the jar and parts 45 at the top thereof dip into the water and/or liquid nutrient in the pan 38. The nutriment carrier 39 may cover part of the inside cylindrical surface of the jar. Some of the water will drip into the bottom of the jar and will serve to maintain the atmosphere in the jar saturated with water vapor. A cover 40 is preferably employed to prevent the excessive vaporization of the water in the pan 38.

To protect the roots against light, the jar may be wrapped in any opaque material 41, such as black paper or any other suitable material.

The form shown in Figs. 5 and 6 comprises a frusto-conical container 42 of any suitable material and may be a pail of any suitable material. An annular chamber 43 for holding water and/or nutriment surrounds the mouth of the container. An annular cover plate 44 for the chamber 43 is provided to minimize vaporization. The nutriment carrier 46 is disposed against the inner face of the side wall of the container and has parts 47 dipping into chamber 43. The seeds 48 in this apparatus are planted on the inwardly exposed face of the nutriment carrier 46 and the root system 49 grows and develops on the inner face of the carrier while the top of the plant grows upwardly outside the container.

Brackets 50 are supported by the chamber 43 and extend inwardly on top of the container and serve to support the circular glass viewing plate 51. An opaque cover 52 is preferably placed on top of the glass plate 51.

The chamber 43 is provided with a drain cock 53 and similarly the bottom of the container 42 is provided with a drain cock 54.

The container 42 may be supported by the legs 56.

It is desirable that the root systems be exposed to an atmosphere completely saturated with moisture. The additional precaution is therefore taken of providing an apron 55 in the form of an annular strip of a suitable flexible material which is provided with a slitted fringe. This apron is glued to the outer edge of the glass plate 51 and covers the gap between the plate and the upper edges of the container 42 as shown. The tops of the plants push their way through the slits in the apron, and the interior of the container is therefore substantially covered or sealed. Similar means may be employed in other forms of the apparatus.

The nutrient carrier shown in the drawings is preferably a flexible sheet of suitable material. It will be understood, however, that the essential feature of the carrier is its absorbent quality for carrying nutrient from the upper chamber to the seed and/or to the root system.

The term "nutrient" as used in the present specification and claims signifies water or any liquid nutrient in the form of a solution, colloid, or any suitable dispersion.

By means of the present invention the plant, and especially its root system, is grown on the surface of a flexible sheet of material. Practically every portion of the root system is available for inspection, manipulation, or treatment in situ and without disturbing the substratum upon which it is growing. The preservation, mounting, storage, and transportation of the plant are also greatly facilitated.

It will be understood that in the arrangement shown in Fig. 5, a cylindrical container may be employed in lieu of the frusto-conical container shown therein.

The nutrient carrier, while shown in the form of an absorbent sheet that has its upper part dipping in the nutrient chamber, may, if desired, have a separable part which dips into the nutrient chamber and overhangs in contact with the other part which serves as the bed for the growth and development of the root system. In such cases the two parts may or may not be of the same material.

Other modifications will be apparent to persons skilled in the art.

I claim:

1. A receptacle for growing plants, comprising a pan for plant nutrient liquid, and a sheet of water absorbing material having its upper end disposed in said pan and extending in a generally downwards direction therefrom.

2. A receptacle for growing plants, comprising a pan for liquid plant nutrient materials, a chamber below and adjacent said pan, the chamber and pan being so related to each other that a sheet of absorbent material can be placed with its upper end in the pan, and its main portion suspended in, or along one of the walls of said chamber, a glass plate in a wall of said chamber for viewing said sheet and the plants thereon, and an opaque cover for said plate.

3. A chamber adapted to holding a supply of plant nutrient liquid, a chamber below and adjacent thereto, these two chambers being so related to each other that a sheet of absorbent material can be placed with its upper end dipping in the solution held in the first chamber, and its main portion suspended in, or along one of the walls of, the second chamber; a glass plate inserted into an opening in the wall of the second chamber opposite to that along which the sheet is suspended; a hinged cover of opaque material over the glass plate.

4. A chamber adapted to holding a supply of plant nutrient liquid, a chamber below and adjacent thereto and so related to it that a sheet of absorbent material can be placed with its upper end dipping in the solution in the first chamber and its main portion suspended in, or along one of the walls of, the second chamber; a removable glass plate inserted into an opening in and forming a part of the wall of the second chamber against which the sheet of absorbent material lies; a cover of opaque material over the glass plate; a movable cover over the first chamber adjustable so as to leave an opening that the upper part of a plant growing on the sheet of absorbent material can project into the air and light.

5. A chamber adapted to holding a supply of plant nutrient liquid, a chamber below and adjacent thereto, and so related to it that a sheet of absorbent material can be placed with its upper end dipping in the solution in the first chamber and its main portion be suspended in or along one of the walls of the second chamber; a removable glass plate inserted into an opening and forming part of the wall of the second chamber opposite that against which the sheet of absorbent material lies; a cover of opaque material over the glass plate; a movable cover over the first chamber and over the upper end of the second chamber, these being adjustable so that a space is left between them through which the upper portion of the plant may grow into the air and light.

6. An apparatus for growing plants comprising a glass jar, a chamber for plant nutrient liquid disposed near the mouth of said jar, a nutriment carrier disposed against the inner face of the side wall of said jar, said carrier having a part thereof disposed in said chamber, said carrier also serving to support implanted seeds and the roots developing from said seeds.

7. An apparatus for growing plants in the absence of soil comprising a container, an annular chamber surrounding the mouth of said container, and a plant nutriment carrier in the form of a sheet of absorbent material disposed against the inner face of the side wall of said container, said carrier having parts thereof extending into said chamber, the inwardly directed face of said carrier serving to support implanted seeds and the roots developing therefrom, whereby two dimensional root systems may be developed on said sheet.

8. An apparatus set forth in the preceding claim, in which the said container is frusto conical.

9. An apparatus set forth in the next preceding claim, in which the container is provided with a transparent cover plate and an opaque cover plate over said transparent plate.

10. In an apparatus for growing plants without soil and permitting viewing the root system of the plant during its process of growth; the combination of a chamber for housing the root system of the plant, a nutrient container disposed at a level above the major portion of the chamber, and a transparent wall for said chamber permitting viewing the root system of the plant, said chamber having suitable openings in the top thereof permitting the top of the plant to grow into the outer air.

11. In an apparatus for growing plants without soil and permitting viewing the root system of the growing plant; in combination a chamber for housing the root system of the plant, means for feeding nutrient to the root system comprising a nutrient container disposed at a level above the major portion of the chamber, and a transparent wall for said chamber permitting viewing of the root system of the plant, said chamber having suitable openings in the top thereof permitting the upper parts of the plant to grow into the outer air.

12. An apparatus for growing plants on a wet surface and without soil comprising a pan for plant nutrient materials, a supporting structure for such pan, said structure also supporting a side wall adapted to receive a sheet of absorbent material, said side wall having its upper portion disposed near and spaced from said pan and extending downwards therefrom at such an angle that its lower portion is nearer the central vertical axis of the pan than its upper portion.

13. An apparatus for growing plants on a wet surface and without soil comprising a pan for plant nutrient materials, a supporting structure for such pan, said structure also supporting a side wall of transparent material adapted to receive a sheet of absorbent material, said side wall having its upper portion disposed near and spaced from said pan and extending downwards therefrom at such an angle that its lower portion is nearer the central vertical axis of the pan than its upper portion.

14. An apparatus for growing plants on a wet surface and without soil comprising a pan for plant nutrient materials, and a sheet of absorbent material having its upper portion disposed in said pan and extending downwards therefrom at such an angle that its lower portion is nearer to the central vertical axis of the pan than its upper portion.

15. An apparatus for growing plants on a wet surface and without soil, a pan for plant nutrient materials, a supporting structure for said pan, said structure also supporting a side wall having its upper portion disposed near and spaced from said pan and extending downwards therefrom at such an angle that its lower portion is nearer the central vertical axis of the pan than its upper portion, and a sheet of absorbent material having its upper end disposed in the pan and extending downwards therefrom and resting against said side wall and against that face of said side wall which is towards the pan.

16. An apparatus for growing plants on a wet surface and without soil, a pan for plant nutrient materials, a supporting structure for said pan, said structure also supporting a side wall having its upper portion disposed near and spaced from said pan and extending downwards therefrom at such an angle that its lower portion is nearer the central vertical axis of the pan than its upper portion, and a sheet of flexible absorbent material having its upper end disposed in the pan and extending downwards therefrom and resting against said side wall and against that face of said side wall which is towards the pan.

17. An apparatus for growing plants on a wet surface and without soil, a pan for plant nutrient materials, a supporting structure for said pan, said structure also supporting a side wall of transparent material having its upper portion disposed near and spaced from said pan and extending downwards therefrom at such an angle that its lower portion is nearer the central vertical axis of the pan than its upper portion, and a sheet of flexible absorbent material having its upper end disposed in the pan and extending downwards therefrom and resting against said side wall and against that face of said side wall which is towards the pan.

MORRIS A. RAINES.